United States Patent [19]

Sprung

[11] Patent Number: 4,830,276
[45] Date of Patent: May 16, 1989

[54] HEATER SYSTEM FOR GREENHOUSES

[76] Inventor: Philip D. Sprung, c/o 1001 - 10th Avenue, SW., Calgary, Alberta, Canada, T2R 0B7

[21] Appl. No.: 5,424

[22] Filed: Jan. 20, 1987

[51] Int. Cl.$^4$ .............................. F24F 7/00
[52] U.S. Cl. ................... 236/49.1; 237/46; 237/69
[58] Field of Search ............ 237/50, 53, 46, 69; 236/49, 13, 10

[56] References Cited

U.S. PATENT DOCUMENTS

| | | | |
|---|---|---|---|
| 2,319,703 | 5/1943 | Olson | 237/50 |
| 2,816,714 | 12/1957 | Worley | 237/53 |
| 3,357,088 | 12/1967 | Hoffman et al. | 237/53 |
| 3,949,522 | 4/1976 | Kehl et al. | 237/50 |
| 4,020,989 | 5/1977 | Kautz | 126/427 |

Primary Examiner—Henry A. Bennet
Attorney, Agent, or Firm—Kenyon & Kenyon

[57] ABSTRACT

A heating system for warming the space within a greenhouse or similar structure. The heating system comprises a heater means having a heating chamber for air, mounted in a plenum chamber. The plenum chamber is located below the base of the structure and is in fluid communication with the space to be heated. Means are provided to draw air from the plenum chamber into the heating chamber. Air heated in the heating chamber is passed through conduit means to the space. The heating system according to the present invention provides efficient space utilization and improved air circulation over conventional heating systems for greenhouse structures.

11 Claims, 5 Drawing Sheets

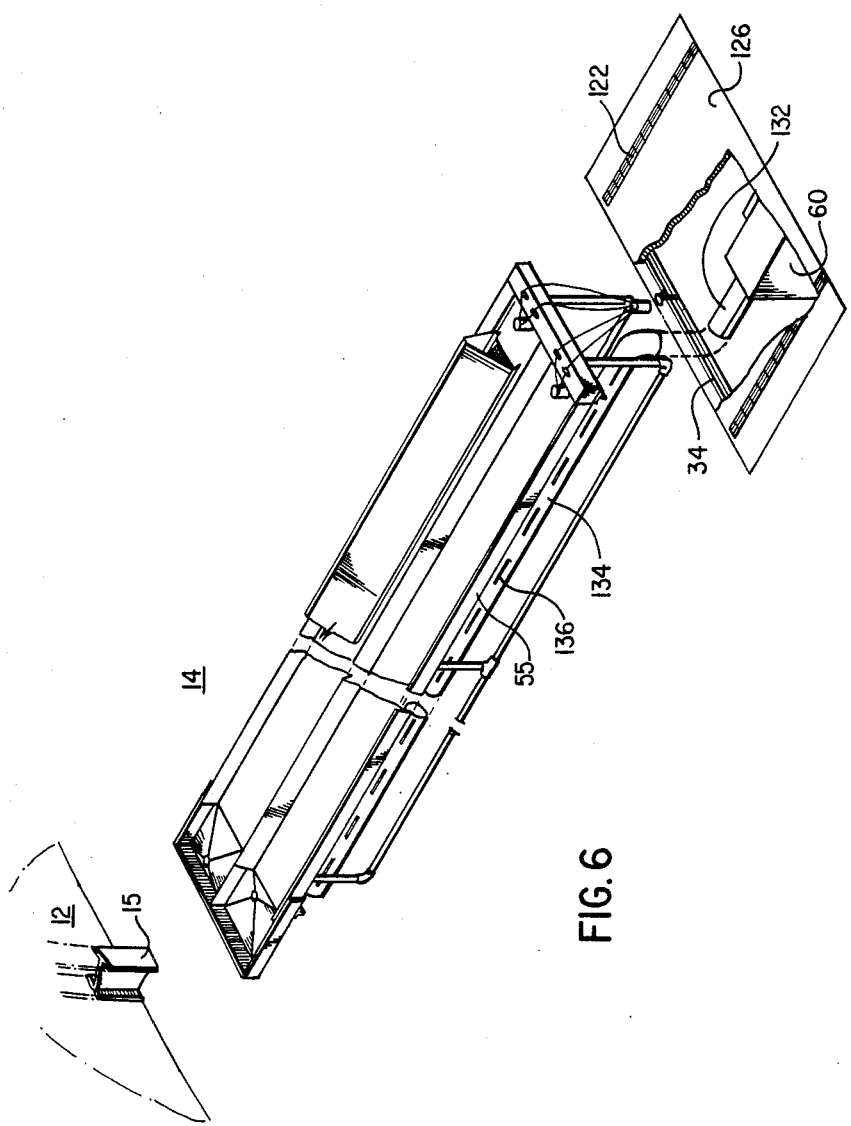

HEATER SYSTEM FOR GREENHOUSES

BACKGROUND OF THE INVENTION

The present invention relates to a heating system, and more particularly to a heating system particularly adapted to greenhouses.

Traditional greenhouse structures, consisting of transparent panes of glass forming a roof to enclose a growing area, drawing air from the outside and having a heater for winter months, while adequate for many purposes, possess many shortcomings which make them unsuitable for year-round production of many types of fruits and vegetables in certain climatic conditions, e.g. in far Northern or far Southern climates where temperature and light conditions may be poor. For example, conventionally the heater is an oil or gas-fired heater, with piping for the oil or gas, and conduits for exhaust gases and heated air all being above the floor level of the greenhouse thereby creating potential shadows and blocking the passage of natural light to the plants. In addition, because such greenhouses often are not well sealed against the outside environment, unsuitable temperature differentials may be created within. As well, outside air which may contain substances which are not conducive to proper growth of plants, is permitted to enter. Also, by-products from the heater system, may be present in the environment within such greenhouses again causing reduced plant growth. There is an increasing awareness of the detrimental impact of impurities in the air on plant growth.

Patents of general background interest describing different types of greenhouse structures include Canadian Pat. No. 1,097,075 of Miller issued Mar. 10, 1981 (nutrient supply system for a controlled environment agricultural installation), Canadian Pat. No. 982,426 of Delano et al issued Jan. 27, 1976 (method of controlling amount of solar heat and light entering a greenhouse wherein the windows of the greenhouse are coated with a plastic film which is transparent under certain conditions and non-transparent under others), Canadian Pat. No. 955,748 of Glady et al issued Oct. 8, 1984 (reduction of the contact angle of water condensate droplets formed on the inner surface of greenhouse windows by coating that inner surface with a surface-active agent), U.S. Pat. No. 4,195,441 of Baldwin issued Apr. 1, 1980 (solar greenhouse in which plants are used as solar collectors to absorb solar radiation and store it in a heat reservoir beneath the greenhouse) and U.S. Pat. No. 4,352,256 of Kranz issued Oct. 5, 1982 (greenhouse structure including a central hub and arms comprising growth chambers extending radially outwardly therefrom).

Other patents of general background interest relating to heating systems for buildings include Canadian Pat. No. 848,301 of Bryant issued Aug. 4, 1970, Canadian Pat. No. 1,189,840 of Dirkes issued July 2, 1985 and U.S. Pat. No. 2,559,868 of Gay issued July 10, 1951.

It is an object of the present invention to provide a heating system which is particularly well-suited for greenhouses, which will provide clean air conditions within the greenhouse space, provide efficient transfer of heat as required to the greenhouse plants and which will not obstruct solar radiation passing to the plants within the greenhouse.

SUMMARY OF THE INVENTION

According to the present invention there is provided a heating system for warming the space in a greenhouse structure for growing plants, the greenhouse having a shell and a base enclosing a predetermined space within which plants are to be grown. The heating system comprises a heater having a heater chamber for air to be passed to that space, the heater being mounted in a plenum chamber. The plenum chamber is located below the base of the greenhouse and is in fluid communication with the space. Where the heater is a combustion heater, the combustion air for the heater is drawn from outside the space and plenum chamber. Waste gases from the combustion heater are passed to means for disposal isolated from the space and plenum chamber. The system also comprises means to draw air from the plenum chamber into the heating chamber and conduit means to guide air heated in the heating chamber to the space.

While the heating system according to the present invention is described as being particularly well-suited for greenhouse structures, it is envisaged that it has more general application than specifically to greenhouse structures, and it is not intended to limit the scope of this invention to such structures.

The heating system of the present invention is however particularly well-suited for use in a greenhouse structure for environmental control of plant growth as described in co-pending U.S. patent application Ser. No. 947,636. In such a structure, where a translucent stressed impermeable fabric shell rests on a base within which the plants are to be grown, the shell and base sealing the environment within the space against external environmental air conditions, the heating system of the present invention not only minimizes obstruction of light passing to the plants, but also maintains air quality conditions within the greenhouse space and effectively and efficiently provides heat to the plants within the greenhouse space as required.

BRIEF DESCRIPTION OF THE DRAWINGS

These and other objects and advantages of the invention will become apparent upon reading the following detailed description and upon referring to the drawings in which:

FIG. 8 is a partial perspective view of a tray for plants within the greenhouse structure, illustrating the hot air delivery system of the heating system in accordance with.

Figure 1:
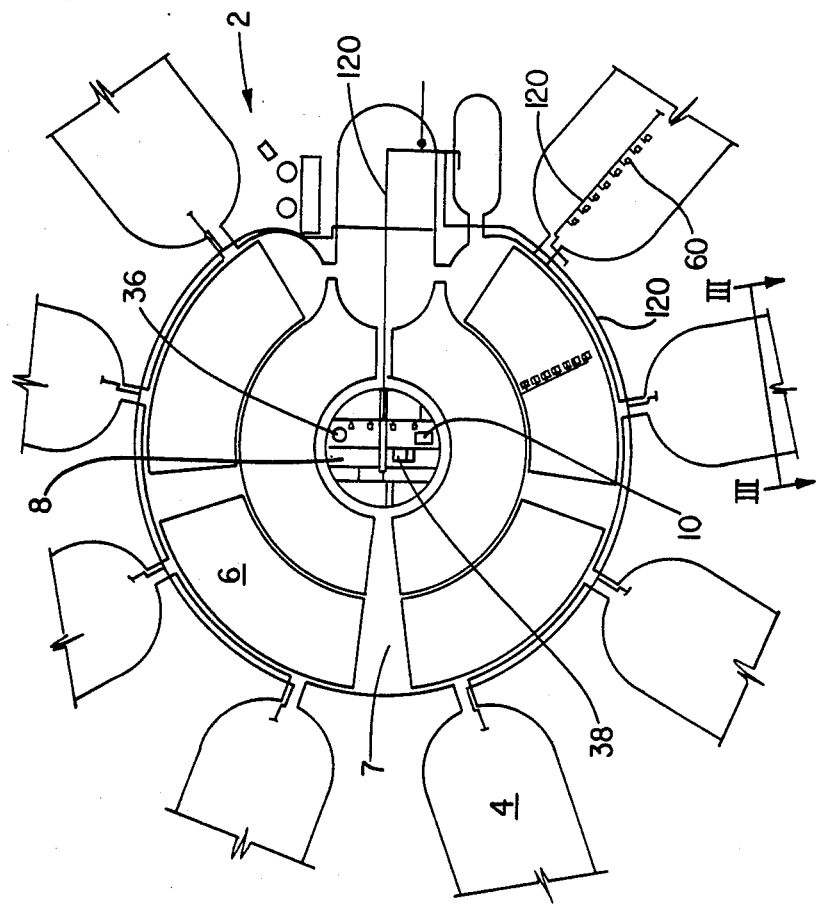
FIG. 1 is a partial schematic plan view of a controlled environmental structure of a type for which the heating system of the present invention is particularly well-suited, schematically illustrating gas lines for a gas heater system in accordance with the present invention.

While the invention will be described in conjunction with an example embodiment, it will be understood that it is not intended to limit the invention to such embodiment. On the contrary, it is intended to cover all alternatives. modifications and equivalents as may be included within the spirit and scope of the invention as defined by the appended claims.

DETAILED DESCRIPTION OF THE INVENTION

In the following description, similar features in the drawings have been given similar reference numerals.

Turning to FIG. 1 there is illustrated a partial schematic plan view of a structure 2 in accordance with the present invention, illustrating many of the features of the structure which permit the control of the environment within elongated, radially positioned production areas 4 and immature crop development areas 6 in central annular corridor 7 of structure 2. In addition, structure 2 has a central control area 8 where a microprocessor 10, the function of which will be described in more detail hereinafter, is located. Each production area 4 is connected as illustrated to central corridor area 7 and may be sealed from the corridor and other production areas, for example to maintain differing aerial environments from one production area 4 to anther, which differing crops may require.

The production and immature crop developments areas 4 and 6 are enclosed by a translucent impermeable stressed fabric shell 12 (FIG. 3) situated on a base 14, the shell and base enclosing predetermined spaces (e.g. production areas 4 or immature crop development area 6). Shell 12 is preferably made of a technically woven polyvinyl chloride coated polyester scrim fabric, with about a 95% light translucency. Such a fabric is highly effective in providing natural light inside the structure and is heat conductive. The fabric is preferably lightweight (e.g. 18 ounces per square yard) and flame resistance, as well as resistant to oil, chemicals, greases, rot, mildew and certain types of bacteria which attack polyvinyl chlorides and which are prevalent in a moist environment. It is preferably held between arched rib members 15 which rest on the base, the rib members being spread to tension the fabric for example as described in my U.S. Pat. No. 4,137,687 issued Feb. 6, 1979.

Figure 3:
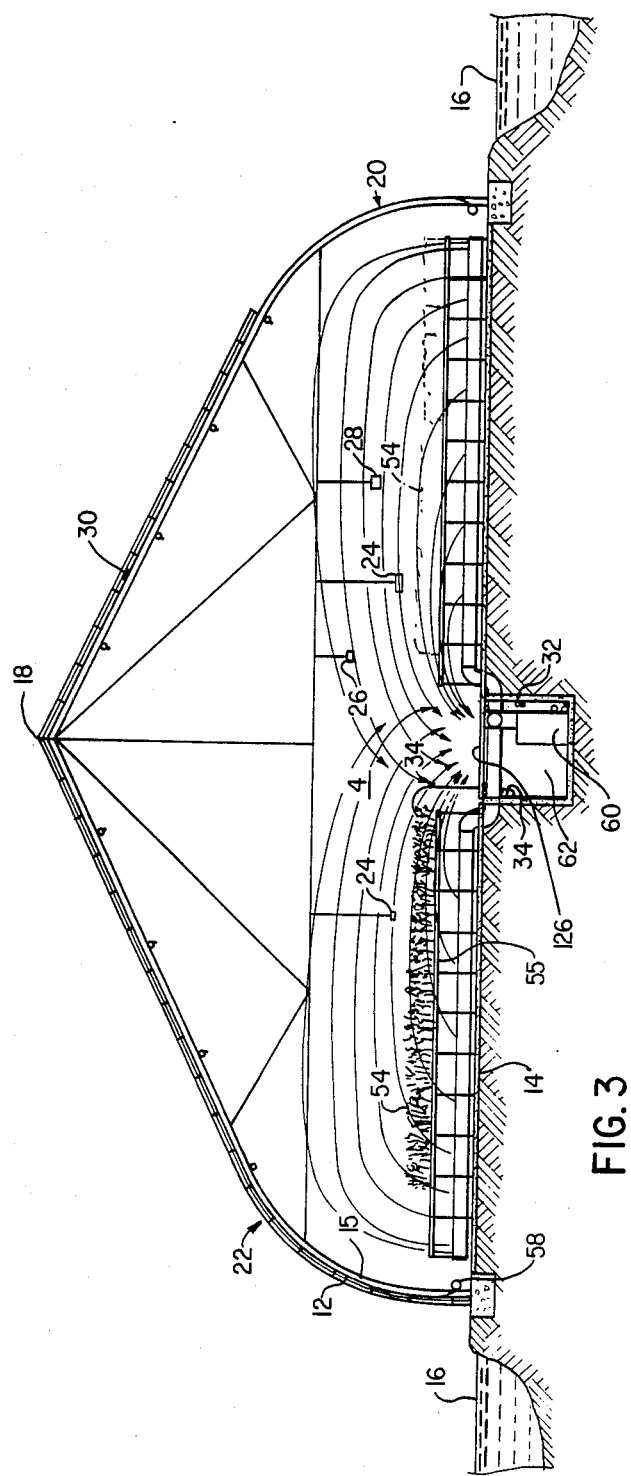
FIG. 3, on the third page of drawings, is a section view along line III—III of FIG. 1, through one of the production areas.

In addition, as can be seen in FIG. 3, the delivery of light to the interior of the structure is further enhanced by the fact that there are very few pipes, waterlines or other physical obstructions allowed above the growing root area. Also, as illustrated in FIG. 3, base 14 for production area 4 is elevated and preferably surrounded by reflective surfaces 16, which may be light coloured surfaces e.g. of reflective plastic, or, water ponds as illustrated, ice surfaces (in below-freezing temperatures) or the like. In this manner, even when there is a low solar angle, light is transmitted by reflection, as well as directly, into the structure through shell 12. As can be seen in FIG. 3, the sides which make up shell 12 extend upward, from base 14, in convex fashion and meet at crest 18, forming two sides 20 and 22 for the shells of each of the elongated production areas 4.

The shells 12 extend over corresponding bases 14 of each of the areas illustrated in FIG. 1 to seal the environment within such areas against external environmental air conditions. This is important since it makes possible the close control of environmental conditions within each of the areas of the structure, such as humidity and carbon dioxide concentration. Otherwise, this would not be possible.

A series of temperature monitor 24, carbon dioxide monitors 26 and relative humidity monitors 28 are provided for the interior atmosphere within each of the production areas 4 and immature crop development areas 6 in question (FIG. 3). As well, in the shell covering each of the areas 4 and 6 are embedded temperature sensors 30. Carbon dioxide delivery systems 32 and nutrient delivery systems 34, the systems delivering respectively carbon dioxide and nutrient solution from sources preferably located in central control area 8 are provided for each of the production areas 4 and immature crop development areas 6. Microprocessor 10, electronically connected to monitors 24, 26, 28 and 30, controls the delivery of carbon dioxide from a source 36 (FIG. 1) and nutrient from reservoir tanks 38 in central control area 8 to areas 4 and 6.

Up to this point in the detailed description of the invention, a structure of the type which is well-suited to receive a heating system in accordance with the present invention has been described. such a structure has many of the features which, in combination with the heating system of the present invention, result in improved production of crops, on a large scale basis, within such a greenhouse structure.

Figure 2:
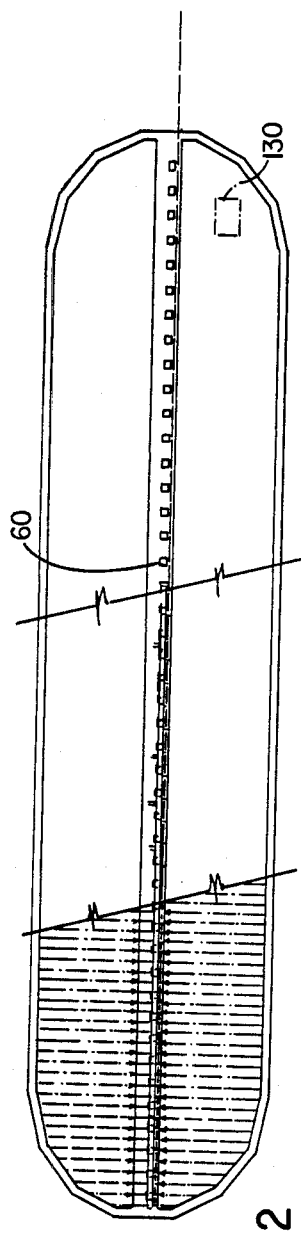
FIG. 2 is a schematic plan view of a greenhouse plant production area of FIG. 1, illustrating a plurality of heaters in accordance with the present invention in conjunction with a carbon dioxide delivery system.
Figure 5:
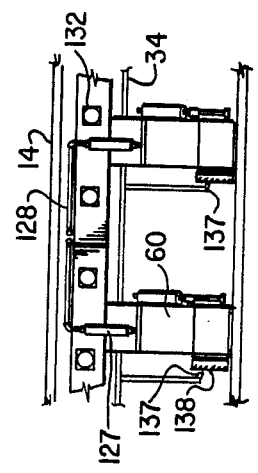
FIGS. 4 and 5 are, respectively end and side views of gas furnaces of the heater system in accordance with the present invention.

As can been seen in FIGS. 2 and 3, the heating system in accordance with the present invention comprises a plurality of appropriate furnaces 60, which may be electric or combustion furnaces for gas or oil. In the present illustrations these are shown as being gas. These furnaces complement the solar heating which occurs as a result of the translucent shell 12 of the structure, and may be required for example during winter or when external conditions are cool. In order to minimize obstructions to light passing to plants 54, these furnaces are positioned in basement corridor 62 or plenum chamber below the floor of base 14. Gas for furnaces 60 is supplied by appropriate gas pipelines 120 (FIG. 1).

Basement corridor 62 is in fluid communication with the space in the production area 4 (or immature crop development area 6) above it, by means of vents 122 in appropriate decking 126 which covers this corridor 62 and provides a central walkway between the rows of trays 55 within which plants 54 are grown (FIGS. 3 and 6).

Furnaces 60 are preferably gas pulse furnaces. For instance, in each production area 4 there are 47 pulse house furnaces located in corridor 62. Each furnace is rated at 100,000 BTU input, with an output of 96,000 BTU at sea level to 2,000 feet in altitude. The blowers on each of these furnaces consist of a one-half horsepower motor which moves air at a rate of 1770 cubic feet per minute.

Figure 4:
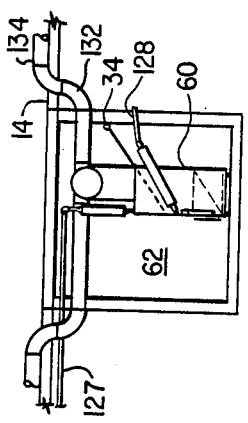

As can be seen in FIG. 4, the pulse furnaces do not use inside air for combustion. Instead this air is drawn from the outside through fresh air intake pipes 127 which are attached to each furnace.

The pulse furnace does not pump pollutants into the atmosphere and little sunlight is blocked by waste gases, giving the structure 2 a clean, no-factory look. Some waste gases from the combustion of furnaces 60 are condensed and then pumped into a holding tank 130 (FIG. 2) for waste treatment. By insuring that the condensable waste gases are condensed before leaving the furnace the latent heat of condensation is given to the environment within the structure, increasing the efficiency of the furnaces. Any gases which do not condense can escape through exhaust pipe 128 to the outside. In this way, it can be seen that the waste gases are completely isolated from the atmosphere within shell 12, providing a clean environment for the plants with no airborne pollutants from the furnace system.

Inside air is heated through a heat exchanger within furnace 60, as it is sucked through the furnace and blown into the greenhouse through steel ducts 132, passing through base 14, and then through polyethylene heating ducts 134 (FIG. 4). These polyethylene ducts are inexpensive plastic ducts which run underneath the plant trays (FIG. 6), with appropriate apertures 136 spaced along their lengths giving an even air distribution as illustrated in FIG. 3. It can be seen that the warm air flow is directed in such a manner that the areas which require heat receive most of it. Because of the air flow pattern, there is a circular air flow within the units. No air is blown into the peak (during winter) above the plants which allows that air space to remain relatively stagnant. While some heat does transfer into the area above the plants and finally out through the roof, the distance of stagnant or dead air provides an insulative ability. As a result, a great cost saving of energy occurs. As well, since the furnaces themselves are located in corridor 62 which, because of the construction, becomes the return air duct and plenum, a vacuum is created which sucks the air from greenhouse through vents 122 back into this corridor 62. Placing the furnaces in the plenum increases significantly the space utilization of the complex. As well, as can be seen in FIG. 3, no pipes, furnaces, gas lines, etc. for the heating system run above ground to take away from the growing areas and block sunlight.

The same above-mentioned operating principle of the heating system applies in immature crop development areas 6.

Carbon dioxide delivery system 32 has been designed in conjunction with this furnace system. Carbon dioxide outlet nozzles 137 are placed along set locations in corridor 62 (the plenum) by the furnace intake manifolds 138. As furnaces 60 suck in air, the carbon dioxide is sucked in with it and blown through the polyethylene ducts 134. Carbon dioxide monitors 26, placed throughout the greenhouse production areas 4 and immature crop development area 6, are controlled by microprocessor 10. As carbon dioxide levels fall into the nozzles are opened by appropriate solenoid control valves (not shown) until the desired level is given at which point they are closed.

Similarly, of course, the operation of furnaces 60 is controlled by temperature monitors 24 either directly or through microprocessor 10.

Figure 7:
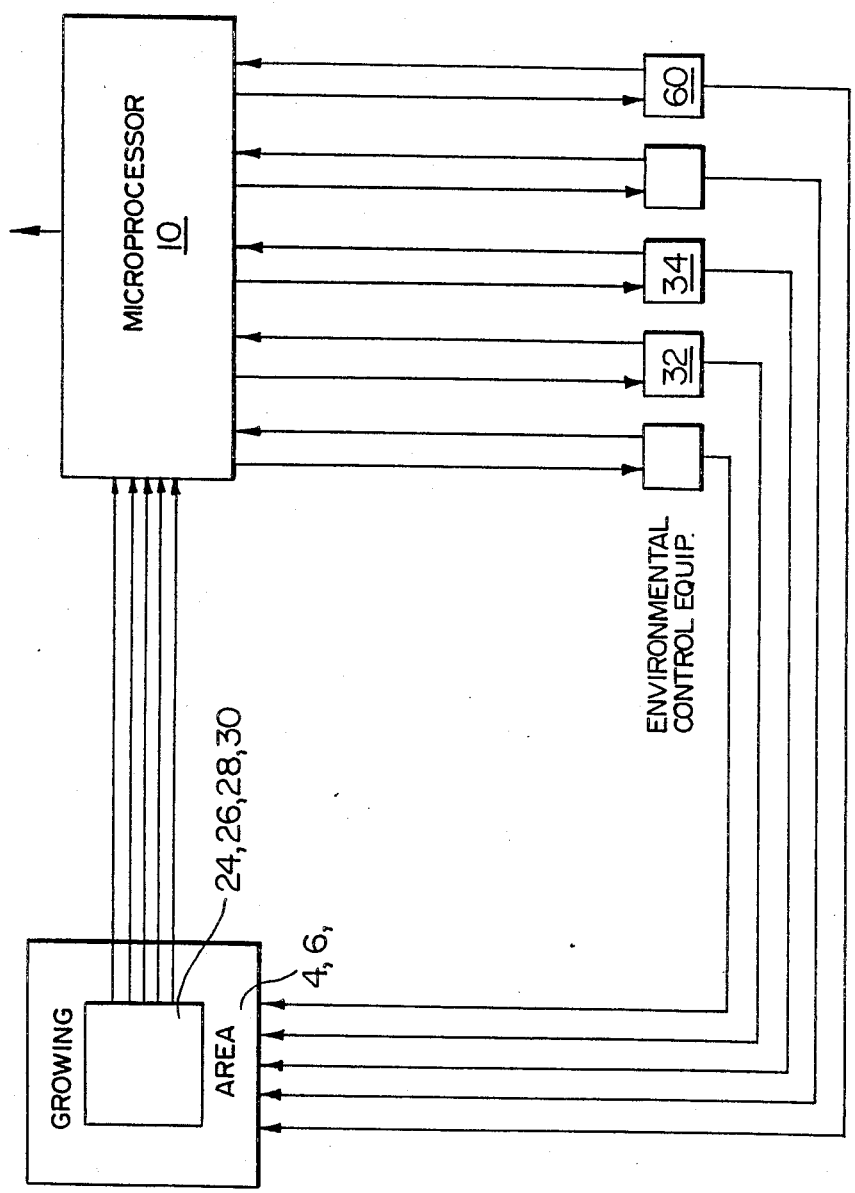
FIG. 7 is a schematic flow chart of a microprocessor used in conjunction with a gas heater system in accordance with the invention.

FIG. 7 is a schematic diagram of a flow chart showing certain of the functions of the microprocessor 10. As can be seen, information from the sensors 24, 26, 28 and 30 in the growing areas 4, 6 is relayed to the microprocessor 10 where the information is analyzed in comparison to operational parameters. The information is then integrated to determine operation of the environmental control equipment represented, in the drawing, by carbon dioxide delivery system 32, nutrient delivery system 34 and furnaces 60. Information from one or more sensors may be used to determine the operational regime.

A control signal is relayed from the microprocessor 10 to the appropriate environmental control equipment, such as carbon dioxide delivery system 32, nutrient delivery system 34 and furnaces 60. This will engage, disengage or begin a cycling procedure. The operational status of each piece of equipment is fed back to the microprocessor 10. This information is analyzed and compared to required operational parameters. Depending upon the control equipment requirements thereby determined, environmental adjustment is exerted on the growing area 4 or 6 by the appropriate environmental control equipment.

It will be clearly understood that the heating system in accordance with the present invention provides not only efficient space utilization and clean environment, but also improved air circulation over conventional heating systems for greenhouse structures.

As well, by utilizing a plurality of smaller furnace sources, several benefits are obtained. The first is from a security point of view. Growing in Northern climates, a mechanical malfunction of the heating system can cause great problems. If a single central heating plant was used and for any reason it was inoperable for an extended period of time, severe damage to the crops would occur. By utilizing a large number of units, several can be non-operational at any time without a risk to security. The cost savings of having a few extra furnaces in this eventuality is significant when compared to having a 100% (or 70%) back up to a central heating plant.

Secondly by integrating a large number of small furnaces with the micrprocessor, it is possible to attain a much more precise environment. By monitoring the rate that the temperature is falling (internal programming to the microprocessor) within the space, the precise number of furnaces required to compensate for that loss may be turned on. The end result is that rather than having quite wide swings about the desired temperature, it is possible to maintain a more precise range of temperatures.

Thus it is apparent that there has been provided in accordance with the invention a heater system for greenhouses and other structures that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention is:

1. A structure comprising
   a shell;
   a base secured to said shell to enclose a predetermined space;
   a plenum chamber extending longitudinally centrally of the structure and located below said base in fluid communication with said space; and
   a heating system for warming said space, said heating system comprising a plurality of heater means mounted in said plenum chamber, each said heater means having a heating chamber for air, means to draw air from said plenum chamber into each said heating chamber and conduit means to guide air heated in each said heating chamber to said space, said conduit means comprising a plurality of conduits extending from said heater means through central portions of said base and transversely along the upper surface of said base below shelving to support plants to be grown.

2. A structure according to claim 1 wherein said heater means is a combustion heater means and combustion air for said combustion heater means is drawn from outside the space and plenum chamber and waste gases from the combustion heater means are passed to means for disposal isolated from the space and plenum chamber.

3. A structure according to claim 2 wherein said combustion heater means comprises a plurality of pulse furnaces.

4. A structure according to claim 3 further provided with microprocessor means to control the operation of the pulse furnaces and temperature sensing means in the space electronically connected to the microprocessor means, the microprocessor means programmed to activate the pulse furnaces when the temperature in the space falls below a predetermined value.

5. A structure according to claim 1 wherein said conduits comprise plastic tubular ducts to provide even distribution of heated air above said base in the space close to where the plants are to be grown.

6. A structure according to claim 5 wherein said conduits are of thin polyethylene material and are pierced to permit escape of heated air into said space at periodic intervals.

7. A structure according to claim 4, further provided with carbon dioxide outlet nozzles in said plenum chamber, carbon dioxide monitor means being provided in said space and electronically associated with said microprocessor, a carbon dioxide source providing carbon dioxide to said outlet nozzles, said microprocessor being programmed to open said nozzles to let a predetermined amount of carbon dioxide into the air in said plenum until a predetermined level of carbon dioxide in said space is attained.

8. A controlled environment structure within which to grow horticultural plants, comprising
a translucent stressed impermeable fabric shell on a base, the shell and base enclosing a predetermined space within which horticultural plants are to be grown against external environmental air conditions;
temperature monitor means for the space;
a plenum chamber below said base in fluid communication with said space;
heater means mounted in said plenum chamber and having a heater chamber for air, means to pass air from said plenum chamber to said heating chamber and conduit means to guide air heated in said heating chamber to said space, said conduit means comprising a plurality of conduits extending from said heater means through central portions of said base and transversely along the upper surface of said base below shelving to support plants to be grown; and
microprocessor control means electronically associated with said temperature monitor and said heater means and programmed to provide optimum temperature conditions for the plants being cultivated in the space.

9. A structure according to claim 8 wherein the heater means is a combustion heater means and combustion air for combustion heater means is drawn from outside the space and plenum chamber and waste gases from said combustion heater are passed to means for disposal isolated from said space and plenum chamber.

10. A structure according to claim 8 further provided with carbon dioxide monitor and carbon dioxide control means for said space, said microprocessor control means electronically associated with said carbon dioxide monitor and control means and programmed to provide optimum carbon dioxide conditions for said plants cultivated in said space.

11. A structure according to claim 10 wherein said conduit means to guide air heated in said heating chamber comprises a plurality of conduits to carry the heated air from said heating chamber to the space above the base and below said plants being cultivated in the space.

* * * * *

UNITED STATES PATENT AND TRADEMARK OFFICE
CERTIFICATE OF CORRECTION

PATENT NO. : 4,830,276

DATED : May 16, 1989

INVENTOR(S) : PHILIP D. SPRUNG

It is certified that error appears in the above-identified patent and that said Letters Patent is hereby corrected as shown below:

```
Column 3, line  5 "alter-natives." should be -alter-natives,-
Column 3, line 26 "anther" should be -another-
Column 4, line 22 "such" should be -Such-
Column 5, line 48 "given at" should be -given, at -
Column 8, line 26 "heater" should be -heater means-
Column 8, line 38 "above the" should be -above said-
Column 8, line 39 "said" should be --the--.
```

Signed and Sealed this

Sixth Day of March, 1990

Attest:

JEFFREY M. SAMUELS

Attesting Officer

Acting Commissioner of Patents and Trademarks